United States Patent [19]
Peng et al.

[11] Patent Number: 5,342,502
[45] Date of Patent: Aug. 30, 1994

[54] METHOD OF PREPARING SILICON CARBIDE PARTICLES DISPERSED IN AN ELECTROLYTIC BATH FOR COMPOSITE ELECTROPLATING OF METALS

[75] Inventors: Yu-Min Peng; Jih-Wen Wang, both of Hsinchu; Chun-Ying Liue, Tau-Yung; Shinn-Horng Yeh, Kaohsiung, all of Taiwan

[73] Assignee: Industrial Technology Research Institute, Hsinchu, Taiwan

[21] Appl. No.: 140,819

[22] Filed: Oct. 21, 1993

Related U.S. Application Data

[63] Continuation of Ser. No. 941,559, Aug. 31, 1992, abandoned.

[51] Int. Cl.$^5$ .................... C25D 15/00; B05D 1/18; C04B 35/56; C01B 31/36
[52] U.S. Cl. .................... 205/109; 423/345; 427/443.1; 501/88
[58] Field of Search .................... 423/345; 427/443.1; 148/DIG. 148; 205/109; 501/88

[56] References Cited

U.S. PATENT DOCUMENTS

| | | | |
|---|---|---|---|
| 3,891,542 | 6/1975 | Cordone | 205/109 |
| 3,904,490 | 9/1975 | Shigeru | 205/109 |
| 4,547,407 | 10/1985 | Spencer | 427/443.1 |

FOREIGN PATENT DOCUMENTS

| | | |
|---|---|---|
| 2110328 | 2/1971 | Fed. Rep. of Germany. |
| 57-71812 | 5/1982 | Japan. |

*Primary Examiner*—John Niebling
*Assistant Examiner*—Brendan Mee
*Attorney, Agent, or Firm*—Ladas & Parry

[57] ABSTRACT

A method for preparing silicon carbide particles dispersed in an electrolytic bath for composite electroplating of metals includes the steps of washing the silicon carbide particles with an organic solvent; washing the silicon carbide particles with an inorganic acid; grinding the silicon carbide particles; and heating the silicon carbide particles in a nickel-containing solution at a boiling temperature for a predetermined period of time.

4 Claims, 7 Drawing Sheets

METHOD OF PREPARING SILICON CARBIDE PARTICLES DISPERSED IN AN ELECTROLYTIC BATH FOR COMPOSITE ELECTROPLATING OF METALS

This is a continuation of application Ser. No. 07/941,559, filed Aug. 31, 1992, now abandoned.

BACKGROUND OF THE INVENTION

1. Field of the Invention

This invention relates to a method for preparing silicon carbide particles, more particularly to a method for preparing silicon carbide particles having an excellent dispersibility in an electrolytic bath for composite electroplating of metals.

2. Description of the Related Art

As is well known, plated nickel coatings having silicon carbide particles dispersed therein, which are obtained by a composite or joint electrodeposition process, have markedly improved wear-resistance, hardness, lubricity and other physical properties. Therefore, the coatings of this character are being widely used for surface protection of various metal articles, including internal combustion engine cylinders. U.S. Pat. No. 3,904,490 disclosed a method in which sericite is added to the electrolytic bath to improve the dispersibility of the silicon carbide particles therein. However, the addition of sericite will change the viscosity of the electrolytic bath and the content of the silicon carbide in the coating. In practice, the content of sericite in the bath is difficult to detect continuously during the electrodeposition process, thus creating an unknown variable factor of the control of the content of silicon carbide in the bath. Therefore, the quality of the coating is difficult to control.

Japanese Patent Publication No. 57-71812 disclosed a method for preparing silicon carbide particles having improved dispersibility, including washing the silicon carbide particles by an acid solution and removing suspended impurities and the residue acid solution on the silicon carbide particles by a hot alkaline solution. In the hot alkaline solution treatment, ammonia water is under a temperature of 90° to 100° C. This causes an evaporation of ammonia water and a bad smell.

SUMMARY OF THE INVENTION

It is therefore a main object of this invention to provide a method for preparing silicon carbide particles having an excellent dispersibility in which the step of addition of a dispersant can be eliminated and no bad smell is produced.

Accordingly, a method for preparing silicon carbide particles dispersed in an electrolytic bath for composite electroplating of metals of this invention, comprises the steps of:

(1) washing the silicon carbide particles with an organic solvent;
(2) washing the silicon carbide particles with an inorganic acid;
(3) grinding the silicon carbide particles; and
(4) heating the silicon carbide particles in a nickel-containing solution at a boiling temperature for a predetermined period of time.

BRIEF DESCRIPTION OF THE DRAWINGS

Other features and advantages of this invention will become apparent in the following detailed description of the preferred embodiments of this invention with reference to the accompanying drawings, in which.

DETAILED DESCRIPTION OF THE PREFERRED EMBODIMENTS

Figure 1:
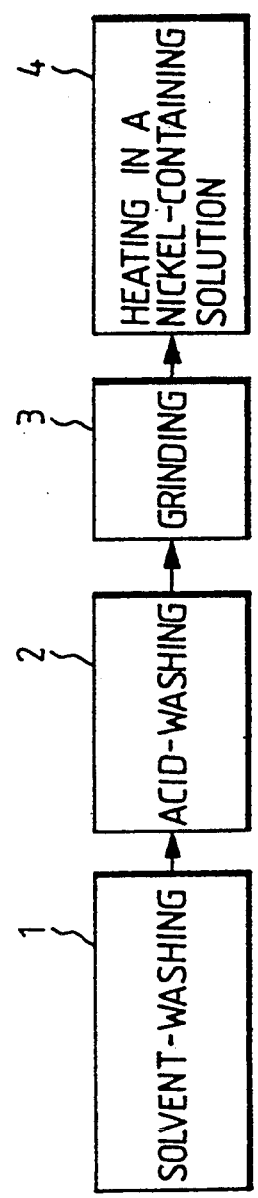
FIG. 1 is a flow diagram showing the method for preparing silicon carbide particles of this invention.

FIG. 1 shows a flow diagram of the method for preparing silicon carbide particles of this invention. The silicon carbide particles are first washed with an organic solvent such as acetone to remove grease and organic impurities, as illustrated in block 1. The silicon carbide particles are then washed with an inorganic acid such as sulfuric acid and hydrogen chloride to remove the metallic impurities, as shown in block 2. The washed silicon carbide particles are ground to have an average diameter of 1.2 to 1.3 $\mu$m to improve the dispersibility in a bath solution, as shown in block 3. The grinding process is undergone for 50 hours in a cylindrical roll mill in which silicon carbide particles with a diameter of 2 to 10 mm are provided as a grinding medium. The grinding period depends on the particle size and the required plating conditions. The ground particles are dipped in nickel sulfate solution of a concentration of 0.2 to 0.5 mole/l and heated to boil for 1 hour or longer, as shown in block 4. Therefore, the surfaces of the silicon carbide particles are liable to attach with positive ions, and the silicon carbide particles are provided with a positive charge. The method of preparing the silicon carbide particles with an excellent dispersibility in a electrolytic bath according to this invention need not add sericite in the electrolytic bath to improve the dispersibility and has no bad smell produced therefrom.

Figure 2:
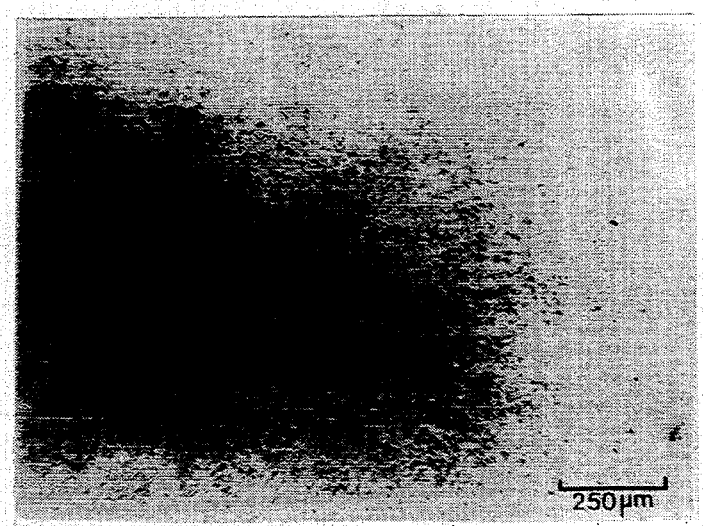
FIG. 2 is a photomicrograph showing the dispersibility of the silicon carbide particles in an electrolytic solution which have been treated by the method of this invention.
Figure 3:
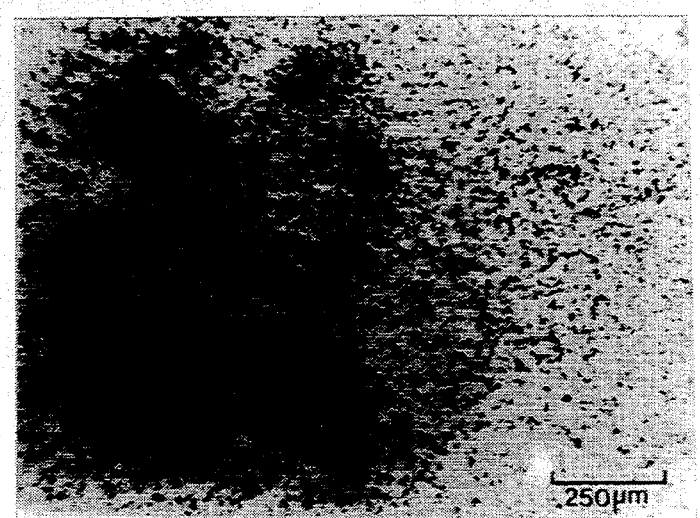
FIG. 3 is a photomicrograph showing the dispersibility of the silicon carbide particles in an electrolytic solution which have not been treated.

FIG. 2 is a photomicrograph showing the dispersibility of the silicon carbide particles in an electrolytic solution which have been treated by the method of this invention. By way of comparison, FIG. 3 is a photomicrograph showing the dispersibility of the silicon carbide particles in an electrolytic solution which have not been treated. It can be found that the silicon carbide particles treated by the method of this invention have a better dispersibility than those of the untreated silicon carbide particles.

Figure 4:
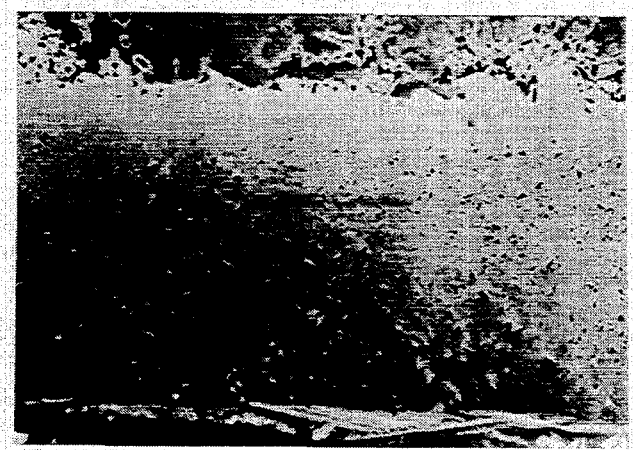
FIG. 4 is a photomicrograph of a section of a coating plated in an article by composite electrodeposition of nickel and silicon carbide.

This silicon carbide particles of this invention are added into a conventional Watts bath to undergo a composite electrodeposition of a nickel and silicon carbide on a metal. The bath contains 310 g/l of nickel sulfate; 50 g/l of nickel chloride; 40 g/l of boric acid; and 40 g/l of SiC powder (13 volume %). The operation conditions are pH=1.5 to 4.0 and the current density=4 to 15 A/dm$^2$. The resultant nickel and SiC electroplated coating is illustrated in FIG. 4, from which it will be noted that the silicon carbide particles are uniformly dispersed throughout the coating. The properties of the Ni—SiC coating with treated and untreated SiC particles and conventional Ni coating are compared in Table 1.

TABLE 1

|  | Ni—SiC coating with untreated SiC particles | Ni—SiC coating with treated SiC particles | Ni coating |
| --- | --- | --- | --- |
| microhardness value (Hv) | 350 ± 80 | 500 ± 50 | 200 ± 20 |
| oil film contact angle (degree) | 9.5 | 8 | 11 |
| sand wheel wear test (mg/1000 cycle) | 3.5 | 2.8 | 4.7 |

Figure 5:
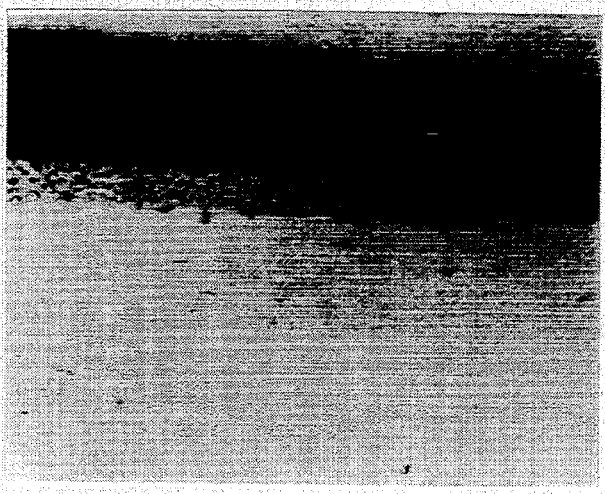
FIG. 5 is a photomicrograph of a section of a coating plated in an article by electroless electrodeposition of nickel and silicon carbide.

The Ni—SiC coating may be obtained by electroless electrodeposition of the silicon carbide particles of this invention and nickel onto a metal, as shown in FIG. 5. The electrolytic bath contains: 12 g/l of SiC powder, 20 g/l of nickel sulfate; 25 g/l of sodium phosphite; 10 g/l of acetic acid; 35 g/l of lactic acid; 2 g/l of propionic acid; and Pb$^{+2}$ 0.3–3 PPM. The pH value of the bath is 4.6 and the operation temperature is 93° C. It will be clearly observed that the fine silicon carbide particles are uniformly dispersed throughout the coating on the metal.

Figure 6:
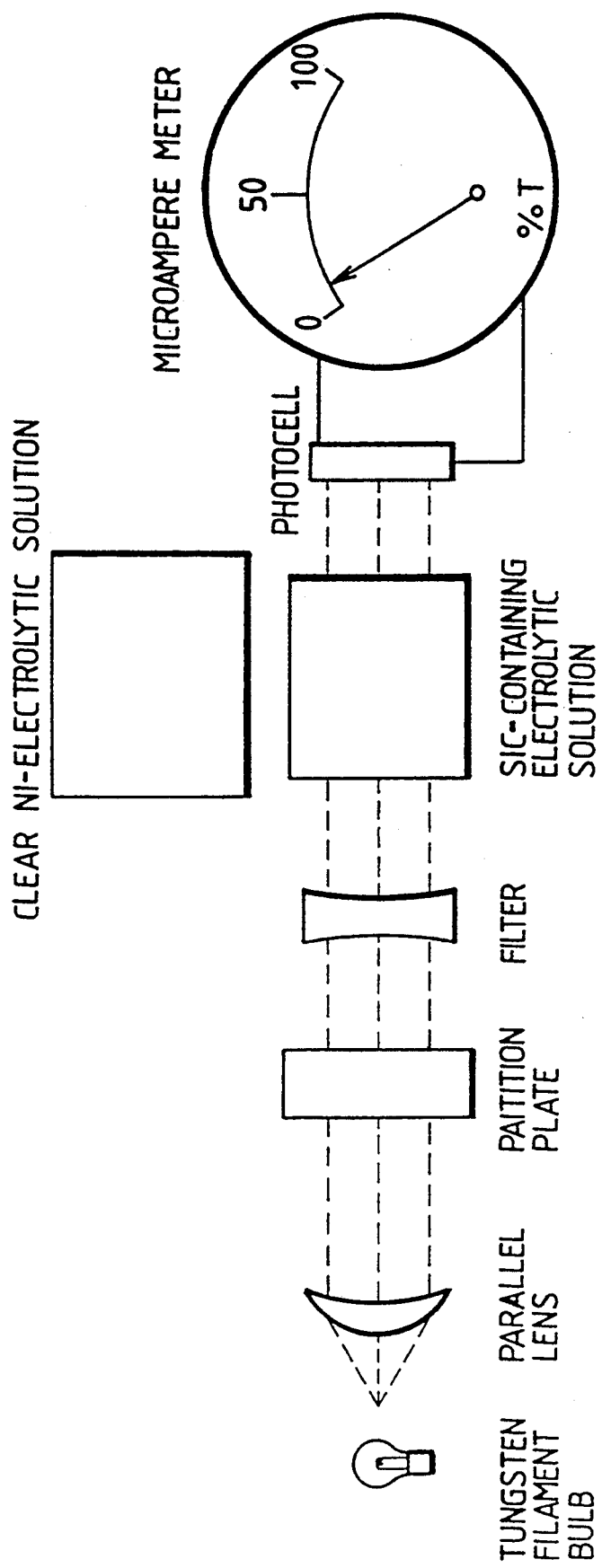
FIG. 6 is a schematic view illustrating a visible photometer device which is used to determine the dispersibility of the silicon carbide in an electrolytic bath.
Figure 7:
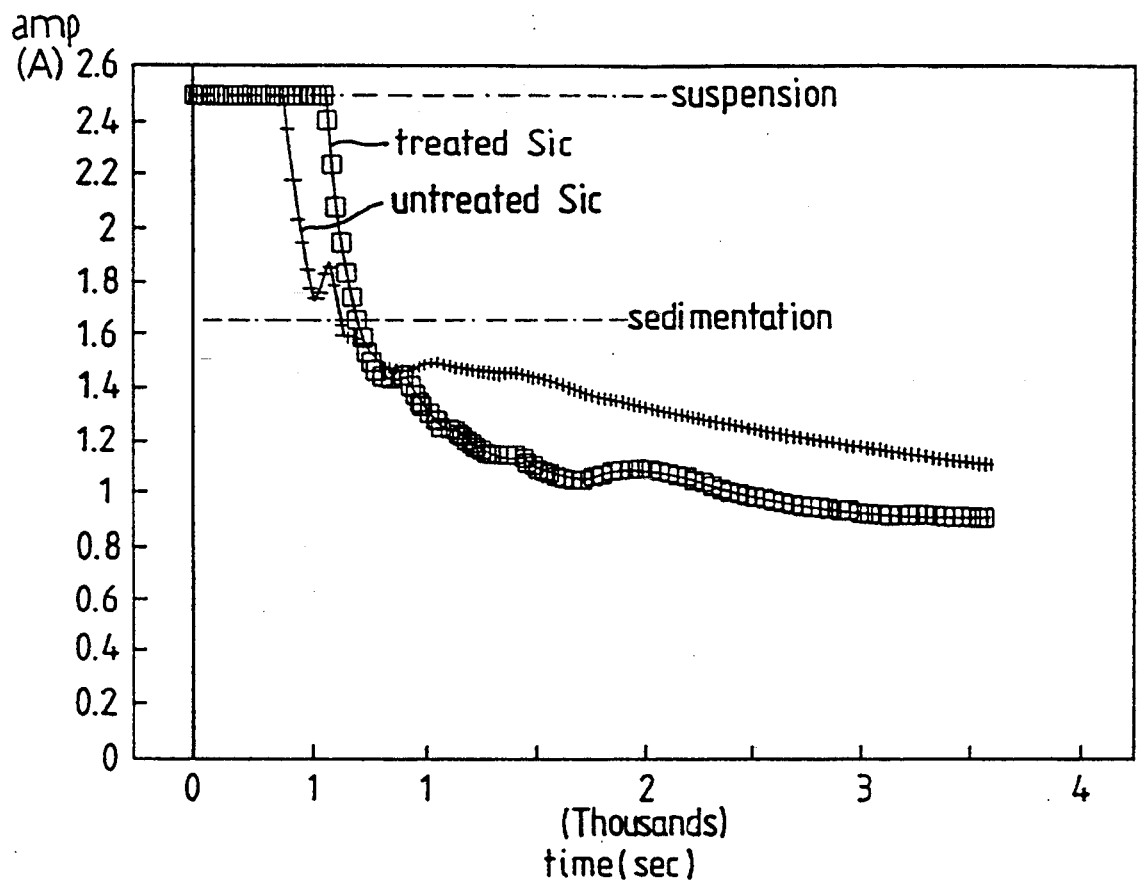
FIG. 7 is a graph indicating the suspension time of the treated and untreated silicon carbide particles in an electrolytic bath according to this invention in which the suspension time is determined by the visible photometer device of FIG. 6.

FIG. 6 is a schematic view illustrating a visible photometer device which is used to determine the dispersibility of the 20 g/l of silicon carbide in an electrolytic bath. The suspension time of the treated and untreated silicon carbide particles in an electrolytic bath according to this invention is determined by the visible photometer device of FIG. 6. The results are shown in FIG. 7. It is found that the suspension time of the silicon carbide particles treated by the method of this invention is 1.4 times that of the untreated silicon carbide particles. Therefore, the sedimentation of the silicon carbide powder because of the coagulation of the silicon carbide powder can be improved by utilization of the silicon carbide obtained from the method of this invention.

Figure 8:
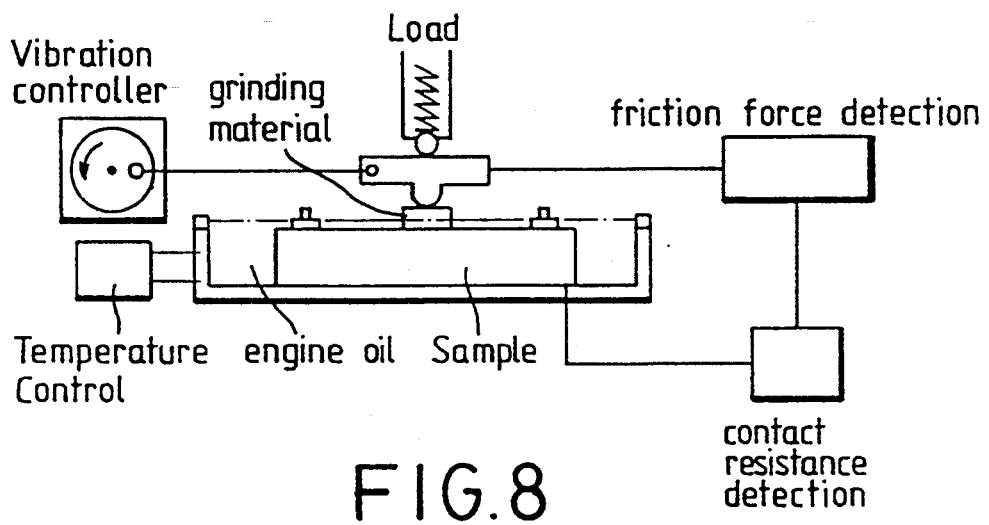
FIG. 8 is a schematic view illustrating a high frequency friction testing machine.

To compare the lubricity and wear resistance of the Ni—SiC coating on cast iron and cast iron which is used to form a cylinder, a high frequency friction testing machine obtained under the trade name TE77 of Cameron Plint Ltd., as shown in FIG. 8, is used to simulate and test the wear of the piston ring between the internal wall face of a cylinder. The testing conditions are shown in Table 2.

TABLE 2

| grinding material | Ni-plated iron disc with a diameter of 1.2 cm |
| --- | --- |
| vibration frequency | 12 Hz |
| load | 2–20 kg/cm$^2$ |
| vibration stroke | 1.5 cm |
| temperature of the engine oil | 100° C. |
| viscosity of the engine oil | SAE30 |

Figure 9:
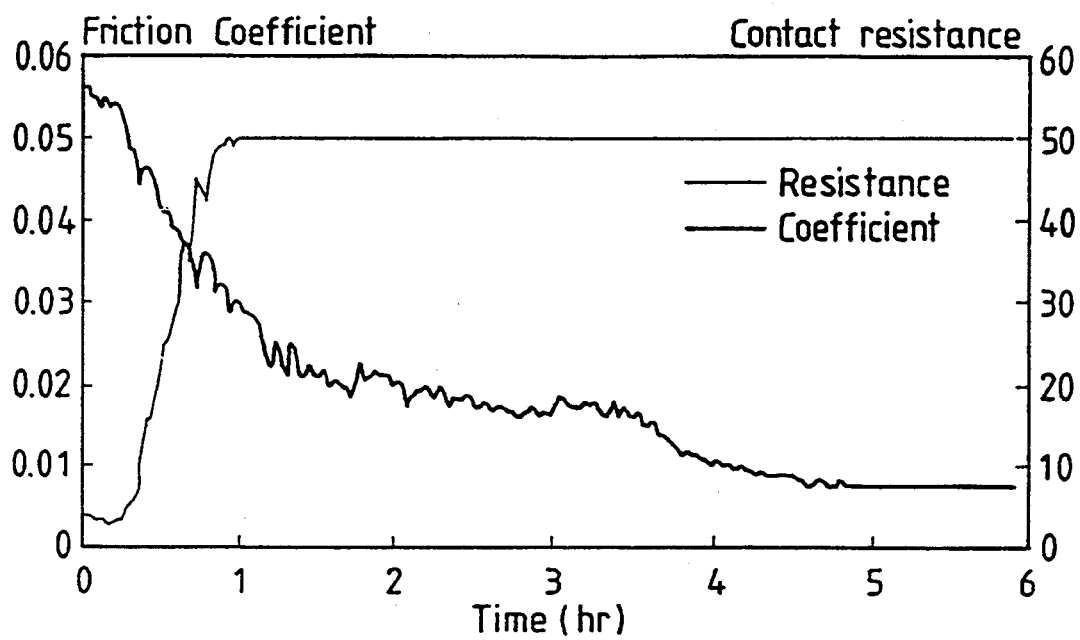
FIG. 9 is a graph indicating the curves of the friction coefficient and the contact resistance of a silicon carbide testing piece against the testing time which are obtained by the utilization of the high frequency friction testing machine of FIG. 8.
Figure 10:
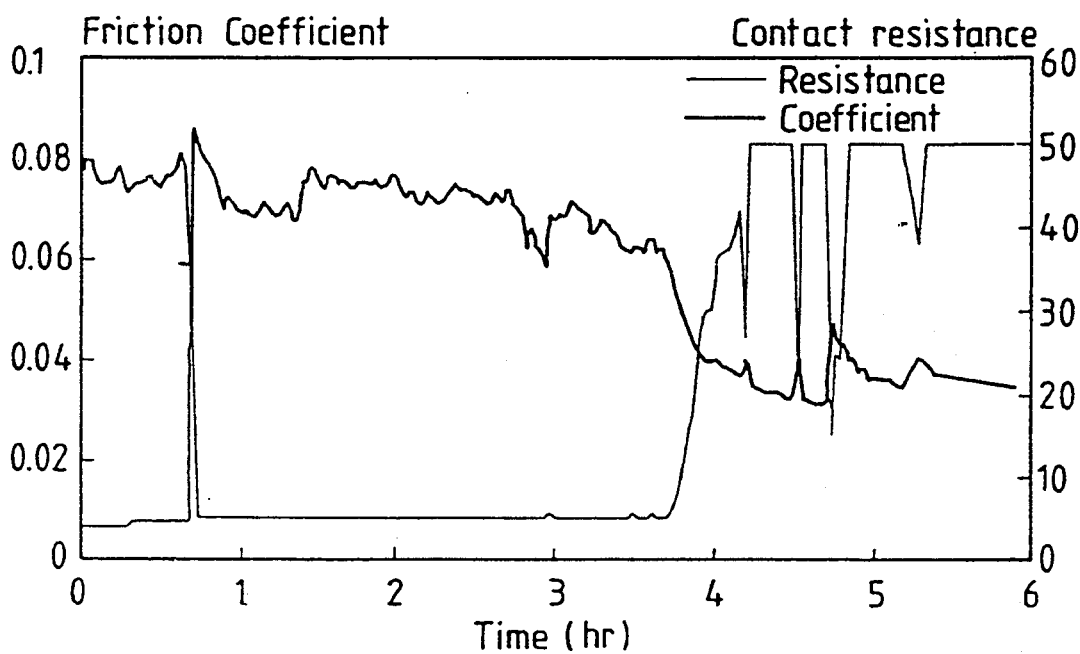
FIG. 10 is a graph indicating the curves of the friction coefficient and the contact resistance of a cast iron testing piece against the testing time which are obtained by the utilization of the high frequency friction testing machine of FIG. 8.

The test results are shown in FIGS. 9 and 10. It can be found from FIG. 9 that the friction coefficient of the Ni—SiC sample decreases as the time increases. Finally, because the ground faces are gradually brought to match each other, the friction coefficient of Ni—SiC is reduced to below 0.01. In addition, it can be found from the contact resistance between the grinding material and the sample that because of the isolation of oil film, the metal surface has a stably high resistance which represents a no contact state and similarly reaches a hydrodynamic lubrication state. Under this condition, the metal surface will not be worn. It can be found from FIG. 10 that although the friction coefficient of the cast iron decreases and the contact resistance gradually increases as the time increases, the contact resistance can not reach a stable value. This means that there is an abrasive wear between the grinding material and the cast iron. Metal particles produced from the abrasive wear will scrape and damage the metal surface, causing the increase of the friction force between the grinding material and the cast iron.

Figure 11:
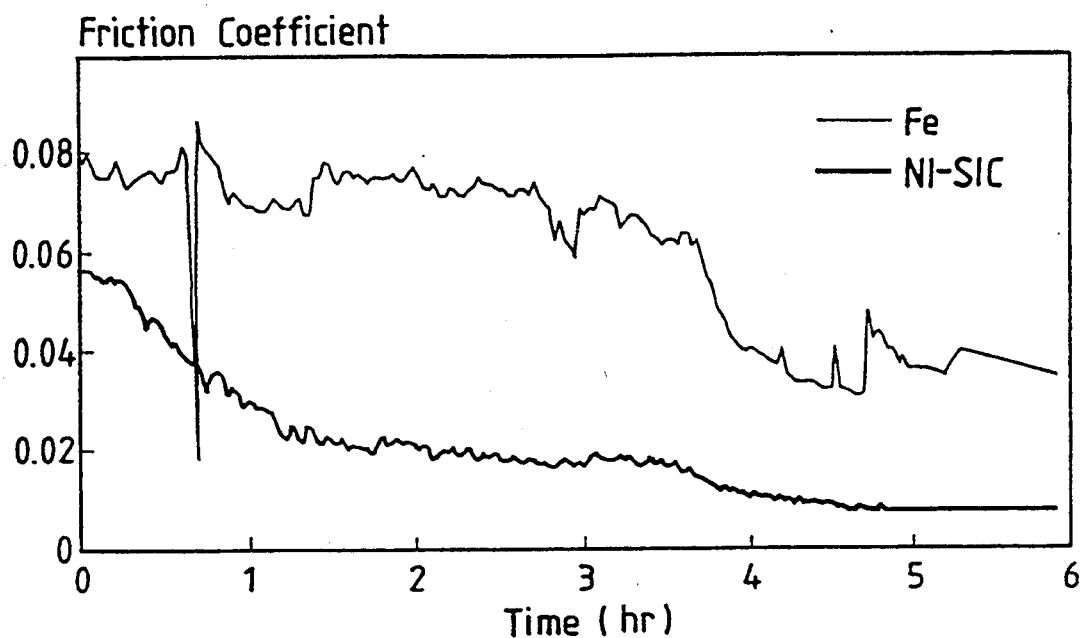
FIG. 11 is a graph indicating the curves of the friction coefficient of the silicon carbide and cast iron testing pieces against the testing time for comparison purposes.

It is found from FIG. 11 the average friction coefficient of the cast iron is four times of that of Ni—SiC coating. Therefore, the Ni—SiC coating has a better lubricity.

Figure 12:
FIG. 12 is a graph indicating the roughness of the cast iron surface which has been worn by the high friction testing machine, the graph being obtained by scanning the cast iron surface by means of a surface roughness meter.
Figure 13:
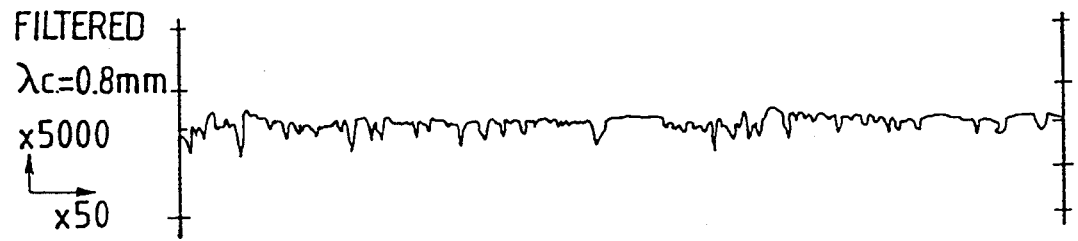
FIG. 13 is a graph indicating the roughness of the silicon carbide surface which has been worn by the high friction testing machine, the graph being obtained by scanning the silicon carbide surface by means of a surface roughness meter.

FIGS. 12 and 13 show that the surface roughness of the cast iron and Ni—SiC coating after they are worn by the high friction testing machine of FIG. 8. These graphs are obtained by scanning the cast iron surface and the Ni—SiC coating by means of a surface roughness meter. It is found that the cast iron surface is ground to a nearly flat face. Therefore, the oil-storage ability of the cast iron will be dramatically reduced, causing the repeated wear of the contact faces. The Ni—SiC coating surface has a plurality of concave recesses so that the engine oil can be stored in the recesses. Therefore, the frictional resistance can be dramatically reduced when engine oil is provided on the surface of the Ni—SiC coating, increasing the wear resistance of the metal with a Ni—SiC coating.

With this invention thus explained, it is apparent that numerous modifications and variations can be made without departing from the scope and spirit of this invention. It is therefore intended that this invention be limited only as indicated in the appended claims.

We claim:

1. A method for treating silicon carbide particles wherein after said treatment said silicon carbide particles are dispersed in an electrolytic bath for both composite electroplating and electroless plating of metals, said treatment comprising steps of:

1) washing silicon carbide particles with an organic solvent;

2) washing said silicon carbide particles of step (1) with an organic acid;

3) grinding said silicon carbide particles of step (2) and 4) heating the ground silicon carbide particles of step (3) in a nickel-containing solution to boiling for a predetermined period of time.

2. The method according to claim 1 wherein said silicon carbide particles of Step (2) are ground for 10 to 120 hours with a grinding medium formed of silicon carbide particles, said silicon carbide particles of said grinding medium having a particle diameter of 2 to 10 mm.

3. The method according to claim 2 wherein the silicon carbide particles of Step (2) are ground to have an average diameter of 1.2 to 1.3 μm.

4. The method according to claim 1 wherein said ground silicon carbide particles of step (3) are heated in nickel sulfate solution of a concentration of 0.2 to 0.5 mole/l to boiling for 1 to 3 hours.

* * * * *